United States Patent [19]

Simonet et al.

[11] Patent Number: 4,917,501
[45] Date of Patent: Apr. 17, 1990

[54] INTERNAL MIXER WITH IMPROVED ROTORS

[75] Inventors: Dominique Simonet, Nohanent; Michel Garmy, Le Cendre, both of France

[73] Assignee: Compagnie Generale Des Etablissements Michelin- Michelin & Cie, Clermont-Ferrand, France

[21] Appl. No.: 361,353

[22] Filed: Jun. 5, 1989

[30] Foreign Application Priority Data

Jun. 16, 1988 [FR] France ................................ 88/08205

[51] Int. Cl.$^4$ ............................ B29B 1/06; B01F 7/04
[52] U.S. Cl. ...................................... 366/99; 366/147; 366/330
[58] Field of Search ..................... 366/99, 85, 97, 147, 366/279, 98, 96, 79, 325, 327, 329, 330; 425/200, 209

[56] References Cited

U.S. PATENT DOCUMENTS 1,773,367  8/1930  Lewis .
3,416,774  12/1968  Fritsch ............................... 366/147
4,040,607  8/1977  Ullrich ................................ 366/85
4,233,676  11/1980  Lipp .................................. 366/147
4,310,251  1/1982  Scharer .............................. 366/85
4,425,962  1/1984  Cameron ........................... 366/147
4,456,381  6/1984  Inoue ................................. 366/97

FOREIGN PATENT DOCUMENTS 1035890  8/1958  Fed. Rep. of Germany .
 531414  10/1921  France .
2302828  3/1975  France .
 157829  4/1922  United Kingdom .

Primary Examiner—Robert W. Jenkins
Attorney, Agent, or Firm—Oblon, Spivak, McClelland, Maier & Neustadt

[57] ABSTRACT

A rotor for an internal mixer includes blades whose profile assures a suitable stress of the rubber between the blade and the inside wall of a chamber. This profile includes a gradual convergent surface, a fine passage surface, a gradual divergent surface and then a zone of break in the continuity of the profile, called a setback, followed by a steeper divergent surface.

5 Claims, 2 Drawing Sheets

INTERNAL MIXER WITH IMPROVED ROTORS

BACKGROUND OF THE INVENTION

1. A Field of the Invention:

This invention relates to internal mixers. More particularly, it relates to the shape of the profile of the blades with which these rotors are equipped.

2. Description of the Related Art:

Internal mixers are mixers of discontinuous operation suitable for the preparation of rubber and other plastic materials. They comprise a closed tank with one or two cylindrical chambers which are connected to one another, each chamber comprising a rotor. Each rotor has one or more blades. The rotor is characterized by its profile (section by a plane perpendicular to the axis of rotation defining the profile of the blades) and by its diagram which is a flat development on a plane parallel to the rotation axis which gives the positioning of the blades at the surface of the rotor, particularly the position, the orientation relative to the edges, and the extent of the zone of minimum space between the wall of the chamber and the surface of the rotor (zone subsequently called "fine passage").

The choice and the combination of the number of chambers as well as the type of rotor used depends on the composition of the mixtures of rubber or plastic materials to be made. The most widely used internal mixers for the preparation of unvulcanized rubber comprise two chambers and two nonmeshing rotors, turning in opposite directions at various rates. An example is seen in U.S. Pat. No. 4,456,381.

The object sought in internal mixers is to force the components of the mixture to pass from one chamber to another and, inside one chamber, from one side to another, in the axial direction of the latter, and also to force the mixture to pass between the blades of the rotors and the walls of the tank. This makes it possible to make a macrodispersion of the components and a microdispersion of the additives. The macrodispersion involves the transfer of mass of material between the chambers of the tank and the axial transfers, i.e. along the blades of the rotor in each chamber, whereas the microdispersion is primarily provided by the passage between the blade and the wall of the chamber.

The rotors of internal mixers have the drawback of exhibiting, in the fine passage part, a zone of intense work of short length, which stresses the materials in a sudden and irregular manner and causes significant slippages, as well for certain elastomers cohesion losses accompanied by a poor mixing state. FIG. 1 is a view of a known blade profile 10 of rotor 1. In particular, the presence of sharp edges 20 which delimit, on both sides, fine passage zone 21 is seen. The side defined as being in front of fine passage 21 that upstream from the latter in the direction of rotation of rotor 1 (arrow 11), which therefore corresponds to a convergent surface of the blade cooperating with the wall of chamber 2. Conversely, the back side has a divergent surface and is located on the opposite side from the convergent surface relative to the direction of rotation. Behind fine passage 21, it is also seen that there is a sudden and significant increase of the space between blade 10 and the wall of chamber 2.

In addition, conventional internal mixers cannot assure a good control of the heat exchanges which occur during the mixing cycle.

SUMMARY OF THE INVENTION

Accordingly, one object of this invention is to improve the microdispersion obtained through the action of an internal mixer, by proposing a new design of the profile of an internal mixer blade.

Another object of the invention is to improve the capacity of a blade thus optimized to evacuate the heat released through the mixing operation.

According to the invention, the internal mixer comprises, a mixing tank including at least one cylindrical chamber in which a rotor turns, the rotor comprising at least two inclined blades, each of the blades having a profile which defines a convergent surface and a first divergent surface with the wall of the chamber. The convergent and the first divergent surfaces being connected by a fine passage, wherein the center and radius of curvature of the profile are substantially constant o both sides of the fine passage. The profile comprises a setback which is separated from the fine passage in a direction opposite to the direction of rotation of the blade and is always followed, in the direction opposite to the direction of rotation of the blade, by a second divergent surface which has a steeper profile than the first divergent surface.

An improved internal mixer rotor according to the invention contains no sharp edges in the fine passage part where the most intense stress is produced. Actually, the convergent part has a convex profile. This profile is approximately preserved in the fine passage and after the latter. Therefore the beginning of the divergent surface, just behind the fine passage, is very gradual. There is a slow and gradual release of the stress beyond the fine passage, contrary to the prior technique where the fine passage also marks the break in the continuity of the profile. The profiles of the blades of the known rotors therefore exhibit a convergent surface which is at times gradual, a fine passage, then a significant divergent surface. The profile proposed by this invention successively exhibits a gradual convergent surface, a fine passage, a gradual divergent surface, then a zone of break in the continuity of the profile, called a setback, followed by an accentuated divergent surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
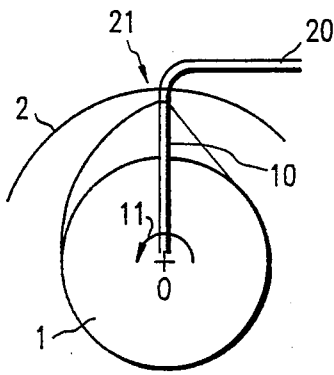
FIG. 1 illustrates a conventional blade profile of a rotor.
Figure 2:
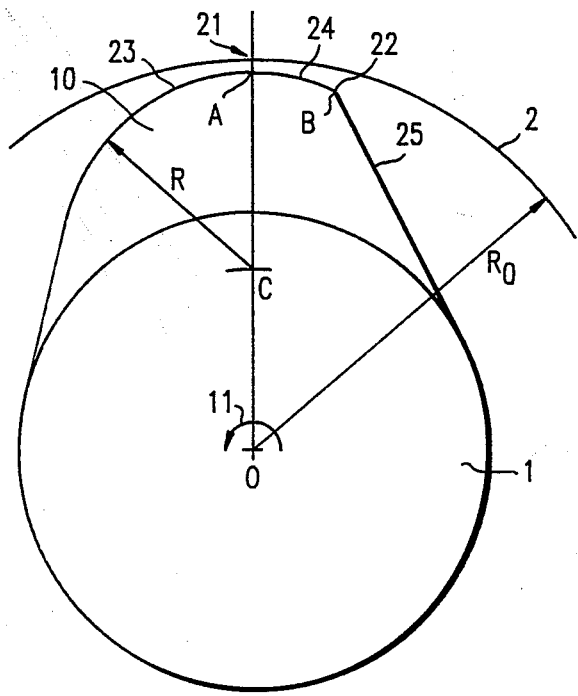
FIG. 2 shows the profile of a blade according to the invention.

In FIG. 2, a rotor 1, a blade 10, and the wall of chamber 2 in which the rotor is used, are illustrated. Blade 10 defines, with the wall of chamber 2, a convergent surface 23 then a surface at the fine passage 21. There is a very clear distance between fine passage 21 and the so-called setback zone 22, separating a first gradual divergent surface 24, from a steeper second divergent surface 25.

Convergent surface 23 of the profile is defined in a plane perpendicular to the axis of the rotor by an arc having a center C and a radius of curvature R. The center and radius of curvature R are constant along the blade profile. The center of curve C is such that its distance from the axis of rotor 0 is between the values 0.1 Ro and 0.6 Ro where Ro is the radius of the chamber 2. The radius of curvature R is itself between the values 0.4 Ro and 0.7 Ro. Fine passage 21 is defined in a plane perpendicular to the axis by point A of maximal distance from the axis of the rotor, in other words, minimal space with the wall of chamber 2. Divergent surface 24 just after fine passage 21 comprises a profile designed in the same way (radius of curvature chosen in the same interval) as convergent surface 23. Point B which is the line of a sharp edge, illustrates in this example setback 22 and is located at a distance from the point A eight times greater than the clearance between point A and the wall of the chamber.

Figure 3:
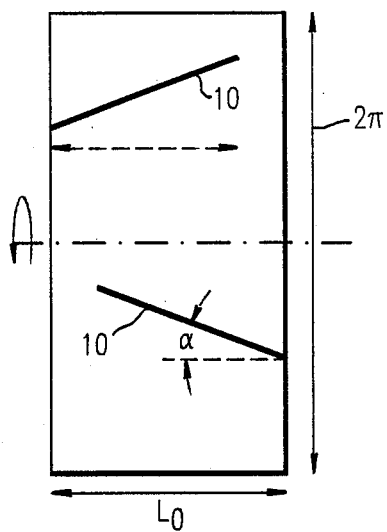
FIG. 3 shows a diagram of an internal mixer rotor.

These geometrical characteristics have been determined experimentally and make it possible to make, by adopting the diagram shown in FIG. 3, excellent performance of macrodispersion and microdispersion. In this diagram, it is seen that two blades 10 extending in the axial direction over a length between 0.6 Lo and 0.8 Lo, where Lo is the length of rotor 1, are used. Blades 10 are inclined in opposite directions by an angle $\alpha$ between 15° and 30° with respect to the rotor axis.

Such a profile makes a gradual stress of the material between the wall of the chamber and the rotor at each passage of the material possible. There no longer exist sudden stresses. It also makes the mixing of the material after the fine passage and the relaxation of the material possible. Such a profile, moreover, makes a good microdispersion of the reinforcing fillers possible. Because of this, cohesion losses of the material brought about by significant slippages to the wall, observed in the conventional structures, are avoided, which makes it possible to obtain a better final state of mixing.

Figure 4:
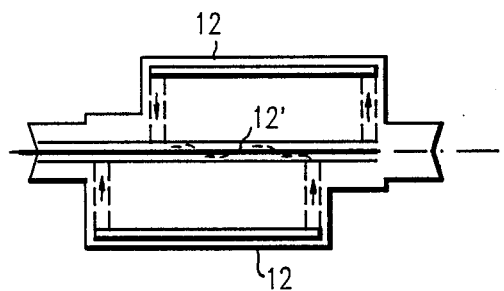
FIGS. 4 and 5 illustrate the cooling of a blade according to the invention.
Figure 5:
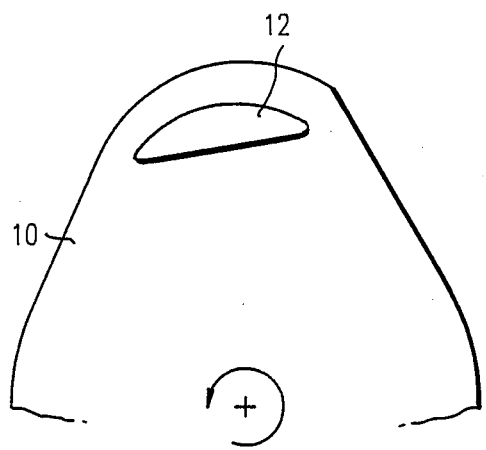

Finally, an improved internal mixer rotor 1 according to the invention has cooling passages 12 preferably and principally extending in the blades 10 under convergent surfaces 23 where the most intense releases of heat (FIG. 4 and 5) occur. The cooling passages in the blades connect with supply and discharge ducts 12' in the rotor. The coolant flow is used to obtain an optimal heat exchange, the cooling chambers being connected in series. Rotor 1 according to the invention offers a mechanical strength sufficient for the installation of such ducts in the zones of intense working of the material.

It is quite clear that various modifications can be made to the blades of the internal mixers without going outside the scope of this invention each time the essential characteristics relating to the profile of blade 10 are reproduced.

What is claimed as new and desired to be secured by Letters Patent of the United States is:

1. An internal mixer comprising:
   a mixing tank including at least one cylindrical chamber; and
   a rotor rototably mounted in said chamber, said rotor comprising at least two inclined blades, each of said blades having a profile which defines a convergent surface and a first divergent surface with the wall of said chamber, said convergent surface and first divergent surface being connected by a surface at a fine passage with respect to the wall of said chamber, wherein the center and radius of curvature of said profile are substantially constant on both sides of said fine passage, wherein said profile comprises a setback which is separated from the fine passage in a direction opposite to the direction of rotation of the blade and is always followed, in said direction opposite to the direction of rotation of the blade, by a second divergent surface which has a steeper profile than said first divergent surface.

2. Internal mixer according to claim 1, wherein the curvature meets the following equations:

$$0.1\ Ro < OC < 0.6\ Ro$$

$$0.4\ Ro < R < 0.7\ Ro$$

where
Ro is the radius of curvature of the mixing chamber
0 is the center of the mixing chamber
R is the radius of curvature of the profile
C is the center of curvature of the profile.

3. Internal mixer according to claim 1, wherein the distance separating said setback from the fine passage is greater than eight times the interval between the rotor and the wall of the chamber at the fine passage.

4. Internal mixer according to claim 1, wherein the distance separating said setback from the fine passage is greater than eight times the interval between the rotor and the wall of the chamber at the fine passage.

5. Internal mixer according to claim 4, including inner cooling means in said blade and having passages positioned substantially under said convergent surfaces.

* * * * *

UNITED STATES PATENT AND TRADEMARK OFFICE
CERTIFICATE OF CORRECTION

PATENT NO. : 4,917,501

DATED : APRIL 17, 1990

INVENTOR(S) : DOMINIQUE SIMONET ET AL

It is certified that error appears in the above-identified patent and that said Letters Patent is hereby corrected as shown below:

Column 4, line 45, change "1" to --2--;

Column 4, line 49, change "4" to --3--.

Please switch claims 4 and 5 around. Claim 4 should now be claim 5 and claim 5 should now be claim 4.

Signed and Sealed this

Twenty-second Day of October, 1991

Attest:

HARRY F. MANBECK, JR.

*Attesting Officer*      *Commissioner of Patents and Trademarks*